Aug. 22, 1967  F. E. ROM ETAL  3,336,749
NUCLEAR ROCKET MOTOR
Original Filed Feb. 20, 1963  2 Sheets-Sheet 1
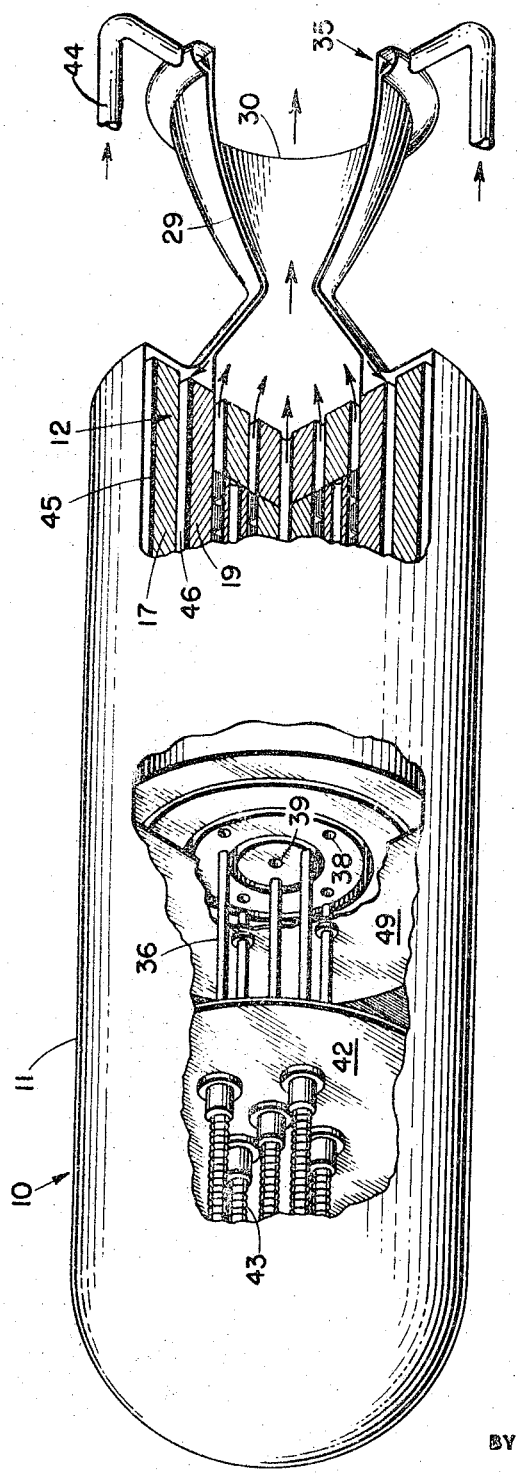
INVENTORS
FRANK E. ROM
ARMIN F. LIETZKE
ROBERT E. HYLAND
BY
ATTORNEY Aug. 22, 1967

F. E. ROM ETAL 3,336,749

NUCLEAR ROCKET MOTOR

Original Filed Feb. 20, 1963

INVENTORS
FRANK E. ROM
ARMIN F. LIETZKE
ROBERT E. HYLAND

BY

Gene E. Shook

ATTORNEY

United States Patent Office 3,336,749
Patented Aug. 22, 1967

3,336,749
NUCLEAR ROCKET MOTOR
Frank E. Rom, Avon Lake, and Armin F. Lietzke and Robert E. Hyland, Westlake, Ohio, assignors to the United States of America as represented by the Administrator of the National Aeronautics and Space Administration
Original application Feb. 20, 1963, Ser. No. 260,085. Divided and this application Dec. 16, 1964, Ser. No. 420,249
3 Claims. (Cl. 60—203)

ABSTRACT OF THE DISCLOSURE

A propulsion system having a rocket motor with a nuclear reactor in which fuel elements of spaced tungsten uranium dioxide plates are arranged in annular relationship adjacent a solid moderator. A liquid propellant passes through the fuel element in the spaces between the plates.

---

The invention described herein may be manufactured and used by or for the Government of the United States of America for governmental purposes without the payment of any royalties thereon or therefor.

This application is a division of our copending application Ser. No. 260,085, which was filed Feb. 20, 1963, which is a continuation-in-part of our earlier application Ser. No. 28,172, filed May 10, 1960, both now abandoned.

This invention relates to an improved nuclear rocket propulsion system for a booster, missile, or spacecraft. More particularly, the present invention is concerned with a nuclear rocket having a solid reactor core for heating a propellant, such as hydrogen, to an extremely high temperature to obtain the highest specific impulse of the propellant as it is exhausted through a rocket nozzle.

As pointed out in the copending application, present propulsion systems for spacecraft rely on so-called chemical rockets which utilize a combination of a liquid fuel and a liquid oxidant that is mixed together in a combustion chamber and exhausted through a nozzle to produce the thrust that is required to propel the rocket and payload. Present chemical rockets have low specific impulses as compared with nuclear rockets, and the exceedingly large assembled take-off weights of the chemical rockets is undesirable. Specific impulse is defined in the art as the pounds of thrust produced for each pound per second of flow of a propellant through a rocket nozzle. Conventional chemical propellants have specific impulses of about 250 pounds of thrust per pound per second of flow while the best chemical propellants have specific impulses of about 400 pounds per pound per second flow. With such relatively low specific impulses the best chemical rockets available have assembled take-off weights for manned moon landings and return on the order of 200 to 300 pounds per pound of payload, even with all the stages utilizing high energy fuels.

The present invention overcomes the disadvantages of the low specific impulses inherent in chemical rockets because nuclear energy, which has about two million times the energy of chemical propellants, is utilized to heat an ideal rocket propellant and eject it through a rocket nozzle. The rocket motor of the present invention uses hydrogen which is the best rocket propellant because it has the lowest molecular weight and can be ejected through the rocket nozzle at the highest velocity for a given area ratio and temperature. This rocket motor further utilizes tungsten clad fuel elements which increases the reactor performance to a point where the specific impulse of the rocket motor is about one thousand pounds of thrust for each pound per second flow of propellant through the rocket nozzle.

It is, therefore, an object of the present invention to provide a nuclear propulsion system having an improved fuel element resulting in a higher specific impulse than conventional chemical rockets to insure power capability for sustained trips in space.

Another object of the invention is to provide a low power nuclear rocket motor for interplanetary travel which is reliable, controllable, and of low weight with a high specific impulse.

Other objects and advantages of the invention will be apparent from the drawings and the specifications which follow wherein like numerals are used throughout to identify like parts.

In the drawings:

FIG. 1 is a perspective view, with parts broken away, showing a nuclear rocket constructed in accordance with the present invention.

FIG. 2 is a pictorial view of a space vehicle utilizing the nuclear rocket shown in FIG. 1 as a propulsion means.

Figure 3:
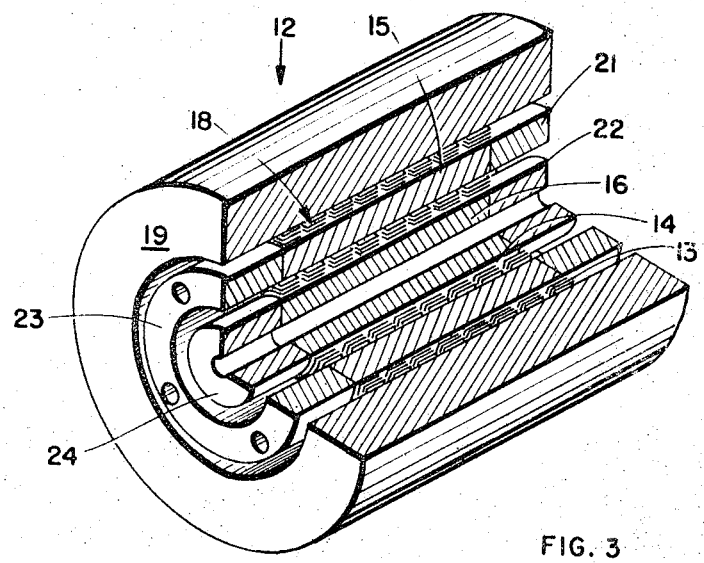
FIG. 3 is a quarter-section in perspective of a solid reactor core constructed in accordance with the present invention.

Referring now to FIG. 1 there is shown a nuclear rocket 10 having a pressure shell 11 for enclosing a solid core reactor 12. By way of example, a solid core reactor 12 of the type shown in FIGS. 1 and 3 having a power rating of 6.7 megawatts would have a diameter of 28 inches together with a length of 36 inches and would weigh approximately 1900 pounds. The solid core reactor 12 contains a plurality of elongated fuel elements 18 of the type shown in FIG. 4 which extend longitudinally along the reactor core and are arranged in two concentric annuli 13 and 14.

A moderator in the form of a hollow cylinder 15 separates the annuli 13 and 14 while another moderator in the form of a cylindrical core insert 16 is mounted within the inner annulus 14 as shown in FIGS. 1 and 3. The moderator for the cylinder 15 and the core insert 16 is selected on the basis of its ability to produce a minimum reactor size and to operate at as high a temperature as possible. Both the cylinder 15 and the core insert 16 are made of hot pressed blocks of beryllium oxide because this material is capable of operating at the high temperatures utilized in the present invention, and a lighter weight reactor is produced because the moderating characteristics of beryllium oxide are superior to other materials, such as graphite. Beryllium oxide is also completely combatible with hydrogen, the propellant in this instance, at high temperatures while graphite is not compatible with hydrogen unless it is protected by a coating or an inhibitor contained in the hydrogen propellant. Cooling of the moderator is provided by the flow of hydrogen through the fuel elements 18, and the hydrogen temperature is maintained sufficiently low by utilizing the proper size passages so that the beryllium oxide is kept below 4000° F.

The solid core reactor 12 further includes a neutron reflector in the form of a pair of concentric beryllium metal tubes 17 and 19 which encircle the fuel elements 18 in the outer annulus 13 and aid in the reduction of the required core size by retaining neutrons within the reactor core. Beryllium metal is used as a reflecting material in the tubes 17 and 19 instead of beryllium oxide because its nuclear characteristics are better and it has a lower density. The relatively low temperature limit of the beryllium metal is not prohibitive for its use as a reflector because the tubes 17 and 19 are cooled by the passage of hydrogen propellant through the space between them. The total thickness of the tubes 17 and 19 in the 6.7 megawatt reactor would be six inches.

A pair of neutron reflectors in the form of a ring 21 and a circular disc 22 concentrically mounted therein are provided at the exit end of the reactor core as shown in FIG. 3. These reflectors are of beryllium oxide because the temperature is higher at this end of the core inasmuch as the hydrogen propellant has passed over the fuel elements 18 in the annuli 13 and 14 before it leaves the reactor. These reflectors would have a thickness of six inches in the 6.7 megawatt reactor. In some cases these reflectors may be omitted.

Similar neutron reflectors 23 and 24 which likewise have a thickness of six inches are provided at the opposite end of the core. These reflectors are of beryllium metal because the temperature of the hydrogen propellant at the inlet end of the core is much lower inasmuch as it has not yet contacted the fuel elements 18.

Figure 4:
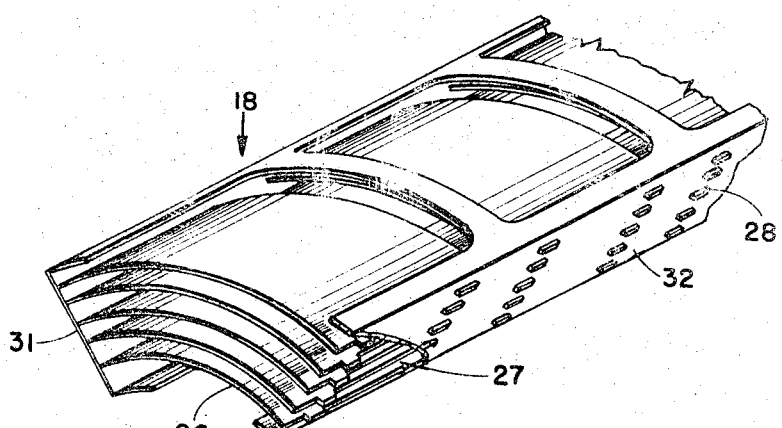
FIG. 4 is a perspective view of a portion of a typical fuel element used in the reactor core.

With reference to FIG. 4, each of the fuel elements 18 of the solid core reactor must be of a material which will provide a heat transfer surface to heat the hydrogen propellant to the highest operating temperature and still be compatible with both the hydrogen and the uranium bearing compound it contains. Tungsten is used in the matrix for the fissionable material in the present invention because this metal has the highest melting point of all metals together with the highest strength at elevated temperatures. Tungsten is also compatible with both hydrogen and uranium dioxide.

Because tungsten is quite difficult to work due to its high temperature strength and brittleness, fuel elements in the annuli 13 and 14 comprise a plurality of flat or slightly curved plates because these shapes are the simplest to make by the metallurgical techniques common in the art. For example, each of the fuel elements 18 comprises an assembly of slightly curved plates 26, each of which is produced by cold pressing tungsten and uranium dioxide powders in the ratio of 20 percent uranium dioxide and 80 percent tungsten by volume. This is followed by a hot sintering operation, and the resulting plate is then clad with tungsten. If desired, the cladding operation may be combined with the pressing operation. The amount of uranium dioxide in the matrix for the plates 26 may vary between 10 percent and 40 percent by volume. The plates for the 6.7 megawatt reactor would have a thickness of 0.034 inch and a length of about 2 inches in the flow direction.

Because in any reactor it is necessary that the material other than the moderator have a low absorption capability to capture neutrons within the reactor and because natural tungsten itself competes with the uranium dioxide for the neutrons generated in the reactor, one of the isotopes of natural tungsten is used in place of pure tungsten. The isotope which is used as the matrix for the uranium dioxide in the present invention is tungsten 184 which can be separated from natural tungsten and has a very low capture crosssection compared with the uranium dioxide within the plates 26.

As shown in FIG. 4, the plates 26 are stacked in spaced relationship, and each plate is provided with tabs 27 which fit into slots 28 in opposed side plates 31 and 32. This series stacking of the plates 26 accommodates the thermal expansion and thermal shock in the fuel elements 18 during a fast start-up. In the example reactor, the gap between the plates 26 is 0.048 inch while the total heighth or thickness of the resulting fuel element is 0.459 inch. After the plates 26 have been attached by the tabs 27 to the side plates 31 and 32, the fuel elements 18 containing the stacked plates 26 are then connected together by joining the side plates 31 and 32 in an annular form by any suitable manner.

As noted above, the reactor core 12 is enclosed in a cylindrical pressure shell 11, and a cooled De Laval rocket nozzle 35 is attached to one end of the the pressure shell 11. The nozzle 35 comprises an outer shell 29 and an inner shell 30. Reactor control is provided at the forward end of the shell 11 by a series of neutron absorbing rods 36 which are distributed uniformly through the beryllium oxide moderator and the beryllium neutron reflectors by providing a plurality of bore holes 38 and 39 whereby control with a minimum of neutron flux distortion is obtained. The bore holes 38 extend through the reflector ring 23 and moderator cylinder 15 while the centrally disposed bore hole 39 extends through the reflector disc 24 and moderator core 16. The neutron absorbing rods 36 are controlled or operated by a plurality of small electric motors (not shown) located on a bulkhead 42 within the pressure shell 11. The motors operate in conjunction with springs 43 to drive the rods 36 into and out of bore holes 38 to control the neutron flux within the reactor core. The power for the electric motors may be provided by solar cells (not shown) mounted on the outside of the pressure shell 11 or by a remote electrical supply source such as batteries or a power generating system.

The liquid hydrogen which is stored in a pressure vessel, such as the tank 47 shown in FIG. 2, is supplied to the powerplant at a pressure of about 35 p.s.i.a. through one or more pipes 44. The hydrogen propellant first passes through the regeneratively cooled rocket nozzle 35 and then flows through passages 45 and 46 adjacent the reflector tubes 17 and 19. The passage 45 is formed by the spacing between the shell 11 and the outer reflector tube 17 while the passage 46 consists of the space between the tubes 17 and 19. As the propellant flows through these passages, it removes heat generated by the neutron and gamma radiations from the core of the reactor. At this stage the hydrogen is completely vaporized and is at a temperature of about −260° F. The vaporized hydrogen is then used to cool the control rods 36 before it passes into the inlet end of the reactor core at a pressure of 25 p.s.i.a. and over the fuel elements 18.

A bulkhead 49 is provided adjacent the inlet end of the reactor core inside the pressure vessel 11 to prevent the hydrogen propellant passing into the chamber adjacent the electric motor drives for the control rods 36. As the hydrogen propellant enters the inlet end of the reactor, it first passes over the beryllium metal reflectors 23 and 24 to cool them. The propellant then passes over the surfaces of the plate 26 in the fuel elements 18 and is heated to a temperature in the neighborhood of 4500° F. while its pressure is reduced to about 10 p.s.i.a. because of accumulated pressure drops. The hydrogen is then ejected through the rocket nozzle 35 with a velocity coefficient of 0.96 to produce the thrust. The nozzle 35 has an area ratio of 50:1 which produces a specific impulse of 940 at the above hydrogen pressure and temperature. If the hydrogen is heated to around 5000° F., a specific impulse of 1050 seconds will result. The hydrogen flow rate is 0.35 pound per second which produces a thrust of 330 pounds. The maximum fuel element temperature is 5000° F. while the maximum moderator temperature is 4000° F. The additional weight of the control rod mechanism, nozzle, pressure shell, solar batteries and guidance systems is about 500 pounds, bringing the total powerplant weight to 2400 pounds. As pointed out above, the nuclear rocket propellant of the present invention can be used either as a propulsion system for a multi-stage booster vehicle or for a spacecraft which has been placed into an orbit about the Earth. With reference particularly to FIG. 2, a nuclear rocket spacecraft using the above-described powerplant 10 which weighs 2400 pounds is illustrated after it has been boosted into about a 300 mile orbit above the Earth by a chemical rocket booster. Approximately 12,100 pounds of hydrogen propellant in liquid form under pressure is stored in the spherical tank 47 which weighs approximately 700 pounds, and the hydrogen will be forced from the tank 47 down through a connecting tubular conduit 55 into the tubes 44 which are in communication with the regeneratively cooled rocket nozzle 35 as previously described. Guy wires 56 connect the rocket motor 10 to the tank 47, and the thrust forces are transmitted from the rocket motor 10 to the tank 47 by the conduit 55. A payload 57 with electronic equipment such as solar batteries, and other telemetering equipment weighing about 9300 pounds is placed on the opposite side of the tank 47 from the powerplant 10 to give the greatest possible protection from radiation produced by the reactor core. This payload 57 is carried by a framework 63 which supports a plurality of discs 59, 61, and 62. The tube 55 is connected to both the tank 47 and framework 63 by a plurality of structural steel members 64, and no shielding is required to protect the liquid hydrogen in the tank 47 from the rocket motor 10 if the angle subtended by the tank is less than 20° because less than one percent of the hydrogen propellant will be evaporated as a result of reactor operations. Payload discs 59, 61, and 62 also act as solar radiation shields for the hydrogen stored in the tank 47 during coasting phases of the spacecraft travel and are fabricated from very light weight material such as plastic sheets on which gold has been plated. During the coast phase the spacecraft is always oriented so that it points towards the Sun to make the discs 59, 61 and 62 effective as solar radiation shields.

The above invention, therefore, provides a solid core nuclear reactor rocket motor wherein a light-weight propellant, such as hydrogen, is heated to a high temperature to produce a specific impulse up to three times that of the present high energy chemical rockets. The invention also overcomes the difficulties of a nuclear reactor having a solid graphite core by using tungsten-184 as the matrix for the fissionable material. Also the heat-exchange characteristics of the disclosed solid core reactor provide a uniform radial temperature throughout the passageways for the propellant, and the reactor is able to heat the propellant to a temperature near the maximum allowable surface temperature of the tungsten.

Obviously, many structural modifications and variations of the present invention are possible in the light of the above teachings. It is, therefore, to be understood that within the scope of the appended claims the invention may be practiced other than as specifically described in this specification. For example, it is contemplated that the concepts of this invention may be used in a reactor core having a power of 1,000 megawatts. Such a core would have a diameter of 40 inches together with a length 42 inches, and would include fuel elements arranged in three concentric annuli. A moderator with a thickness of 5.5 inches would be placed between these annuli, and a six inch thick beryllium side reflector would enclose the core. Each of the fuel elements would have a thickness of 1.2 inches and would comprise a plurality of plates, each having a thickness of 0.015 inch, spaced at a distance of 0.080 inch. The hydrogen flow rate in such a reactor would be 80 pounds per second.

What is claimed:
1. In an improved propulsion system including a rocket motor having a pressure chamber with a rocket nozzle operably connected thereto and means for supplying liquid propellant under pressure to said motor, a nuclear reactor mounted within said pressure chamber, said reactor comprising,
 a plurality of fuel elements arranged in annular relationship, each of said fuel elements having
 a plurality of tungsten uranium dioxide plates, and means for maintaining said plates in spaced relationship,
 a solid moderator adjacent said fuel elements, and
 means for passing said liquid propellant through said fuel elements between said plates whereby said propellant is heated to an elevated temperature prior to exhausting through said rocket nozzle.

2. In a rocket motor having a pressure cell with a rocket nozzle operably connected thereto and liquid propellant storage means operably coupled to said nozzle and said pressure cell whereby a propellant under pressure is supplied to regeneratively cool said nozzle and pass into said pressure cell, a solid core nuclear reactor mounted within said pressure cell, said nuclear core comprising,
 a plurality of fuel elements arranged in annular relationship, each of said fuel elements comprising a plurality of spaced apart tungsten uranium dioxide plates,
 a moderator comprising beryllium oxide blocks adjacent said fuel elements, and
 means for directing the flow of said liquid propellant through said fuel elements between said plates prior to exhausting through said nozzle.

3. In a rocket motor for a spacecraft including a pressure cell having a rocket nozzle operably connected thereto and liquid propellant storage means operably coupled to said nozzle and said pressure cell whereby a propellant under pressure is applied to regeneratively cool said nozzle and pass into said pressure cell, the improvement comprising,
 a solid core nuclear reactor mounted within said pressure cell, and
 means for directing flow of said liquid propellant through said solid core prior to exhausting through said nozzle,
 said propellant consisting of hydrogen, and
 said solid core reactor comprising alternate annuli of spaced apart tungsten-184 uranium dioxide plates and moderator elements whereby said hydrogen is elevated to high temperatures to produce high thrust.

References Cited
UNITED STATES PATENTS

| | | | |
|---|---|---|---|
| 2,780,596 | 2/1957 | Anderson | 176—58 |
| 2,992,981 | 7/1961 | Thomson et al. | 176—58 X |

FOREIGN PATENTS 754,559   8/1956   Great Britain.

OTHER REFERENCES

July 1958, Nucleonics, pages 66–68 (articles by Levoy et al.).

REUBEN EPSTEIN, *Primary Examiner.*